B. Tatham,
Friction Clutch.
No. 101,940. Patented Apr. 12, 1870.
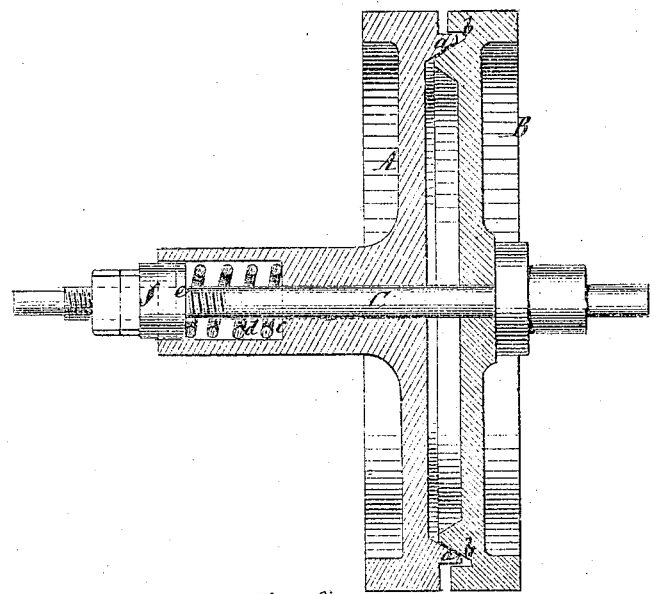
Fig. 2.
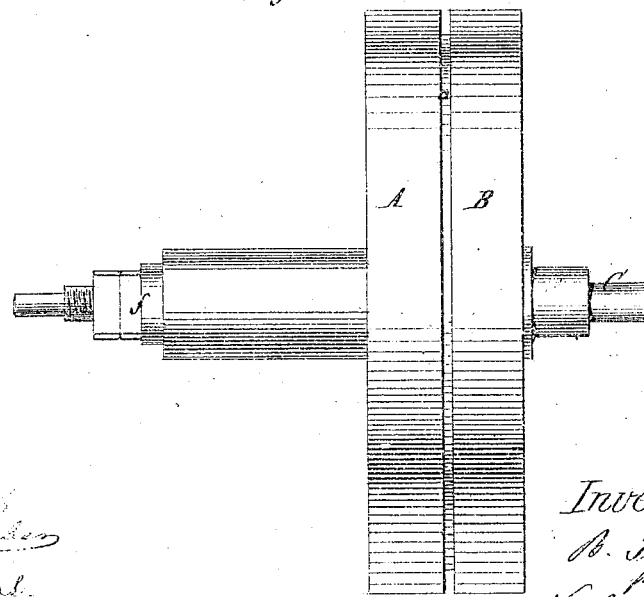
Witnesses
Inventor.
B. Tatham
Van Santvoord & Hauff
Atty

United States Patent Office.

BENJAMIN TATHAM, OF NEW YORK, N. Y.

Letters Patent No. 101,940, dated April 12, 1870.

---

IMPROVEMENT IN REGULATING POWER CONVEYED BY FRICTION-SURFACES.

---

The Schedule referred to in these Letters Patent and making part of the same.

---

*To all whom it may concern:*

Be it known that I, BENJAMIN TATHAM, of the city, county, and State of New York, have invented a new and useful Improvement in the Means of Regulating the Power Conveyed by Friction-Surfaces; and I do hereby declare the following to be a full, clear, and exact description thereof, which will enable those skilled in the art to make and use the same, reference being had to the accompanying drawing forming part of this specification, in which drawing—

Figure 1 represents a longitudinal vertical section of this invention.

Figure 2 is a side elevation of the same.

Similar letters indicate corresponding parts.

This invention consists in the arrangement of a regulating-spring, in combination with the friction-surface of a drum, pulley, cog-wheel, or other device of a similar nature, in such a manner that, by increasing or decreasing the tension of the regulating-spring, the power conveyed by the friction-surface can be adjusted to suit circumstances.

In the drawing—

The letter A represents a pulley, which is mounted loosely on a shaft, C, and from which power is to be transmitted to another pulley, B, which may be fast on the shaft C.

From the pulley A projects a V-shaped rim, $a$, into a corresponding V-shaped groove, $b$, in the pulley B, and the hub of the pulley A is provided with a recess, $c$, to receive a spring, $d$, and a follower, $e$, that is pressed up against the spring by means of a nut, $f$, screwing on the shaft C. By turning said nut in or out, the tension of the spring is increased or decreased, and the friction-surfaces $a$ and $b$ are compressed with more or less power.

By these means the power conveyed from the pulley A to the pulley B can be regulated with the greatest convenience. If, for instance, power is required to the extent of five hundred pounds upon the belt running on the pulley B, the nut $f$ is made to compress the spring $d$ until the friction between the two pulleys will resist five hundred pounds without slipping.

By this arrangement, a person who rents out steam-power is enabled to gauge exactly the power allowed to each tenant.

This arrangement may, however, be also used in such cases where a rope or chain winds upon a drum, and where it is desirable to allow said drum to slip before the strain upon the rope or chain exceeds a certain limit. If the power is applied to the pulley B, for instance, and a rope or chain is made to wind on the hub of the pulley A, the nut $f$ can be readily so adjusted that the pulley A will not slip until the rope or chain has attained the required tension; but as soon as the strain on the rope or chain exceeds the desired limit, the friction-surfaces $a$ and $b$ slip, and the breaking of the rope or chain is avoided.

The spring may be dispensed with, and a lever and weight substituted, to produce the desired amount of friction.

Having thus described my invention,

What I claim as new, and desire to secure by Letters Patent, is—

The means substantially as herein set forth of regulating and transmitting the power conveyed by friction-surfaces.

BENJN. TATHAM.

Witnesses:
E. F. KASTENHUBER,
C. WAHLERS.